United States Patent
Lo

(10) Patent No.: US 12,297,817 B1
(45) Date of Patent: May 13, 2025

(54) POWER OUTPUT ECONOMIZING DEVICE

(71) Applicant: Ching-Ho Lo, Taichung (TW)

(72) Inventor: Ching-Ho Lo, Taichung (TW)

(73) Assignees: Ching-Ho Lo, Taichung (TW); Tzu-Chieh Lo, Taichung (TW)

( * ) Notice: Subject to any disclaimer, the term of this patent is extended or adjusted under 35 U.S.C. 154(b) by 0 days.

(21) Appl. No.: 18/387,471

(22) Filed: Nov. 7, 2023

(30) Foreign Application Priority Data

Dec. 1, 2022 (TW) ................................. 111146083

(51) Int. Cl.
*F03G 3/08* (2006.01)
*F16C 32/04* (2006.01)
*F16F 15/315* (2006.01)

(52) U.S. Cl.
CPC ............ *F03G 3/08* (2013.01); *F16C 32/0408* (2013.01); *F16F 15/3156* (2013.01); *F16C 2361/55* (2013.01); *F16F 2222/08* (2013.01); *F16F 2224/0208* (2013.01); *F16F 2232/02* (2013.01); *F16F 2234/02* (2013.01)

(58) Field of Classification Search
CPC .................................................. F16F 15/3156
See application file for complete search history.

(56) References Cited

U.S. PATENT DOCUMENTS 5,760,508 A * 6/1998 Jennings ............... F16F 15/305
 310/90
2022/0173648 A1* 6/2022 Vang .................... H02K 7/1853

FOREIGN PATENT DOCUMENTS

CN 102130551 A * 7/2011
CN 113078663 A * 7/2021 ............... H02J 3/24

* cited by examiner

*Primary Examiner* — Vicky A Johnson

(57) ABSTRACT

A device for economizing power output includes a circular rotary unit and a holder. When the rotational output end of a power source is connected to a power connection portion of the circular rotary unit and the rotational power is output from a power connection portion to a load, the circular rotary unit is suspended by the holder, so that when the power source drives the circular body to rotate, the circular body can rotate relative to the holder without friction or being in contact with brackets of the holder. The gravitational inertia generated by the circular body during its high-speed rotation enables the power source to drive the load.

8 Claims, 8 Drawing Sheets

POWER OUTPUT ECONOMIZING DEVICE

BACKGROUND OF THE INVENTION

1. Field of the Invention

The invention relates to a power output economizing device that enables a power source to drive a load with lower energy consumption by rotating a circular body without wear.

2. Description of Related Art

Most of the energy sources, such as electricity, water power, wind power, and thermal power, are outputted to a load by means of conversion or rotating a shaft. In the case of a motor that consumes electricity to drive a load, for example, if there is an instantaneous high-frequency change of high and low loads on the load side, it will consume more electricity due to the increase in the instantaneous counter electromotive force (heating) at the high frequency. Furthermore, energy sources such as water power and wind power are not easy to be converted into stable rotational power (difference in torque or speed), and even if the load side is in a stable load state, unstable rotational power will not be fully utilized due to the difference in power output energy. If the rotational power output can resist the high variation of the load, or the unstable rotational power can be stored and output, it should be able to improve the above problems and make the energy efficiency more effective.

SUMMARY OF THE INVENTION

The primary object of the invention is to provide a power output economizing device, comprising a circular rotary unit and a holder.

The circular rotary unit includes a cylindrical circular body with a power connection portion and an output connection portion at respective centers of two end faces thereof. A first magnet assembly is provided on each of circumferential surfaces of two ends of the circular body close to the power connection portion and the output connection portion. A pole of a radial outer surface end of the first magnet assembly is one of south (S) or north (N) poles.

The holder includes a pair of brackets relative to the first magnet assemblies at the two ends of the circular body. The pairs of brackets each have a receiving circular hole corresponding to the circular body. The receiving circular hole has a diameter slightly greater than that of the circular body. The receiving circular hole surrounds a periphery of the first magnet assembly. A second magnet assembly is provided on an inner wall of the receiving circular hole. A pole of a radial outer surface end of the second magnet assembly is the same pole as the first magnet assembly, so that the pair of brackets support the two ends of the circular body in a suspending manner.

When the rotational output end of a power source is connected to the power connection portion of the circular rotary unit and the rotational power is output from the power connection portion to a load, the circular rotary unit is suspended by the holder, so that when the power source drives the circular body to rotate, the circular body can rotate relative to the holder without friction or being in contact with the brackets. The gravitational inertia generated by the circular body during its high-speed rotation enables the power source to drive the load with lower energy consumption, thereby achieving labor-saving or energy-saving benefits.

Preferably, an annular groove is formed on the circumferential surface of each of the two ends of the circular body. The first magnet assembly is composed of a plurality of magnet blocks that are arranged in sequence and secured in the annular groove. The second magnet assembly on the receiving circular hole of each of the pair of brackets is composed of a plurality of magnet blocks that are arranged in sequence and secured on the inner wall of the receiving circular hole. The second magnet assembly and the first magnet assembly form a repulsive magnetic force in the annular groove. By the second magnet assembly being confined in the annular groove to cooperate with the first magnet assembly, both ends of the circular body are supported by the pair of brackets, thereby obtaining a positioning effect to prevent axial detachment.

Preferably, a third magnet assembly is provided on at least one of two axial sides facing each other or not facing each other of the pair of brackets. A pole of an axial outer surface end of the third magnet assembly is one of south (S) or north (N) poles. The two ends of the circular body each have a magnet mounting end face relative to the third magnet assembly. A fourth magnet assembly is provided on the magnet mounting end face corresponding to the third magnet assembly. A pole of an axial outer surface end of the fourth magnet assembly is the same pole as the third magnet assembly. Both ends of the circular body have axial and oppositely oriented repulsive magnetic forces to restrain and counterbalance each other, so that the circular body are confined to rotate relative to the pair of brackets in a manner that does not contact the pair of brackets and does not retreat axially. The third magnet assembly and the fourth magnet assembly are each composed of a plurality of round magnets and/or magnet blocks that are arranged in sequence and secured to the axial side of the corresponding bracket and the magnet mounting end face in a magnetically repulsive manner, so as to achieve the effect that the magnet mounting end face is not in contact with the corresponding bracket.

Preferably, the pair of brackets each includes a pair of half brackets that are connected to each other to form the receiving circular hole. Coupling members are provided on radial outer edges of two butt joints of the pair of half brackets for restricting separation of the pair of half brackets. The connection of the pair of half brackets can be released by the coupling members, which facilitates the assembly or disassembly of the circular rotary unit and the holder. The coupling members on the two butt joints of the pair of half brackets are in the form of a hinge and lugs locked by screws. The coupling member in the form of lugs locked by screws may be used for releasing one of the butt joints of the pair of half brackets, so that the pair of half brackets can be pivoted for mounting or dismounting the circular body.

Preferably, the output connection portion of the circular rotary unit is connected to a clutch. The clutch outputs a rotational power through a power output end. When the circular body is initially rotated by the power source, the clutch selects the power output end not to output rotational force to the load, so that the power source can drive the circular body to rotate without having to bear the load. The clutch is controlled by a controller to control the power output timing of the power output end. The controller detects the rotational speed of the circular body through a rotational speed detector. When the circular body reaches a predetermined high rotational speed, the controller automatically controls the power output end of the clutch to output power. On the contrary, when the predetermined high rotational speed is not reached, the power output of the power output end is paused.

The above and other objects, features and advantages of the invention will become apparent from the following detailed description taken with the accompanying drawings.

DETAILED DESCRIPTION OF THE INVENTION

Figure 1:
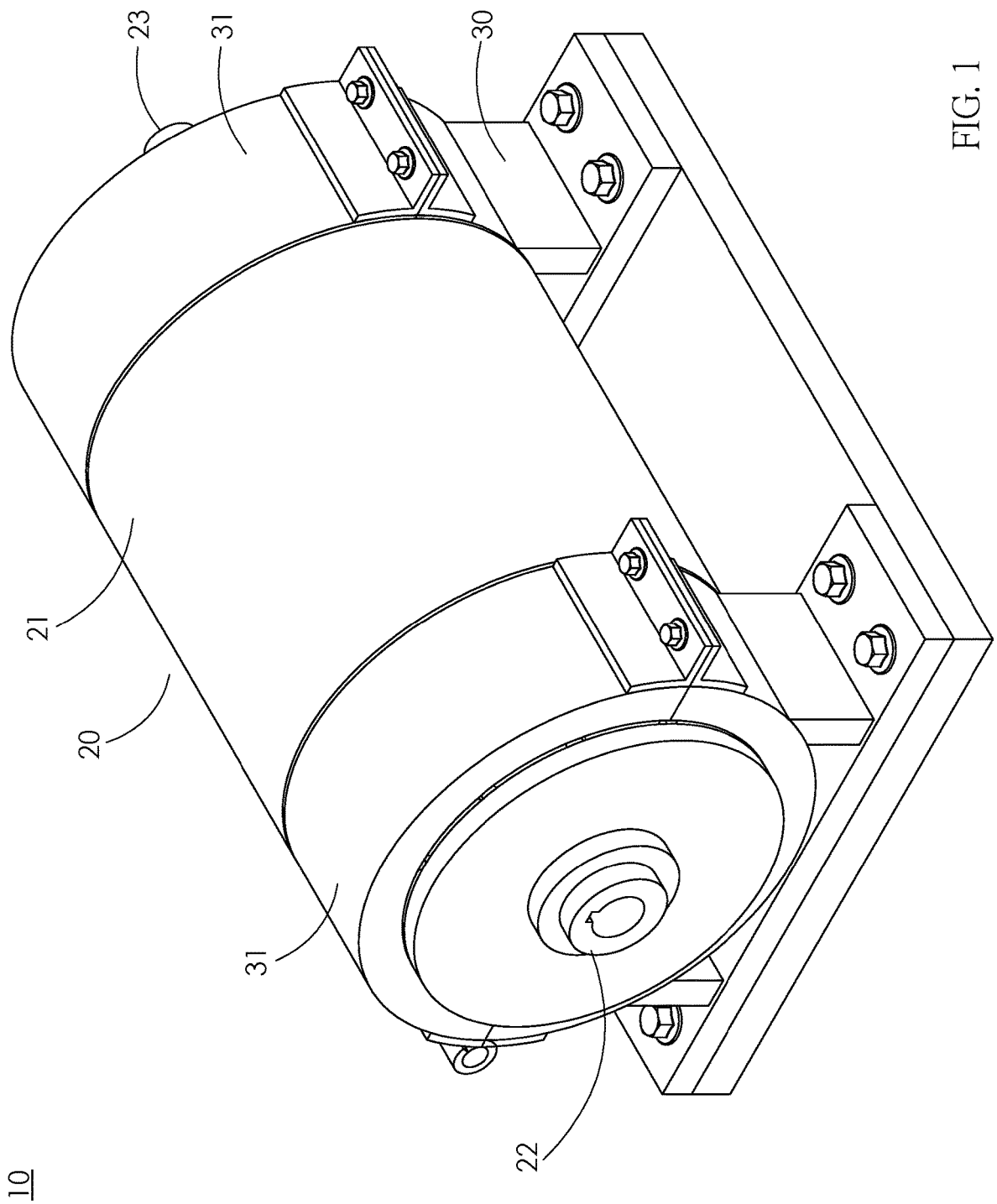
FIG. 1 is a perspective view of the invention.

Referring to FIGS. 1 to 6, a power output economizing device 10 of the invention comprises a circular rotary unit 20 and a holder 30.

The circular rotary unit 20 includes a cylindrical non-magnetic (e.g., 304 or 316 stainless steel) circular body 21 with a power connection portion 22 (which may be a rotating shaft or a shaft hole) and an output connection portion 23 (which may be a rotating shaft or a shaft hole) at the respective centers of two end faces thereof. A first magnet assembly 24 is provided on each of the circumferential surfaces of two ends of the circular body 21 close to the power connection portion 22 and the output connection portion 23. The pole of the radial outer surface end of the first magnet assembly 24 is one of south (S) or north (N) poles.

The holder 30 includes a pair of non-magnetic (e.g., 304 or 316 stainless steel) brackets 31 relative to the first magnet assemblies 24 at the two ends of the circular body 21. The pairs of brackets 31 each have a receiving circular hole 32 corresponding to the circular body 21. The receiving circular hole 32 has a diameter slightly greater than that of the circular body 21. The receiving circular hole 32 surrounds the periphery of the first magnet assembly 24. A second magnet assembly 33 is provided on the inner wall of the receiving circular hole 32. The pole of the radial outer surface end of the second magnet assembly 33 is the same pole as the first magnet assembly 24, so that the pair of brackets 31 support the two ends of the circular body 21 in a suspending manner.

Figure 5:
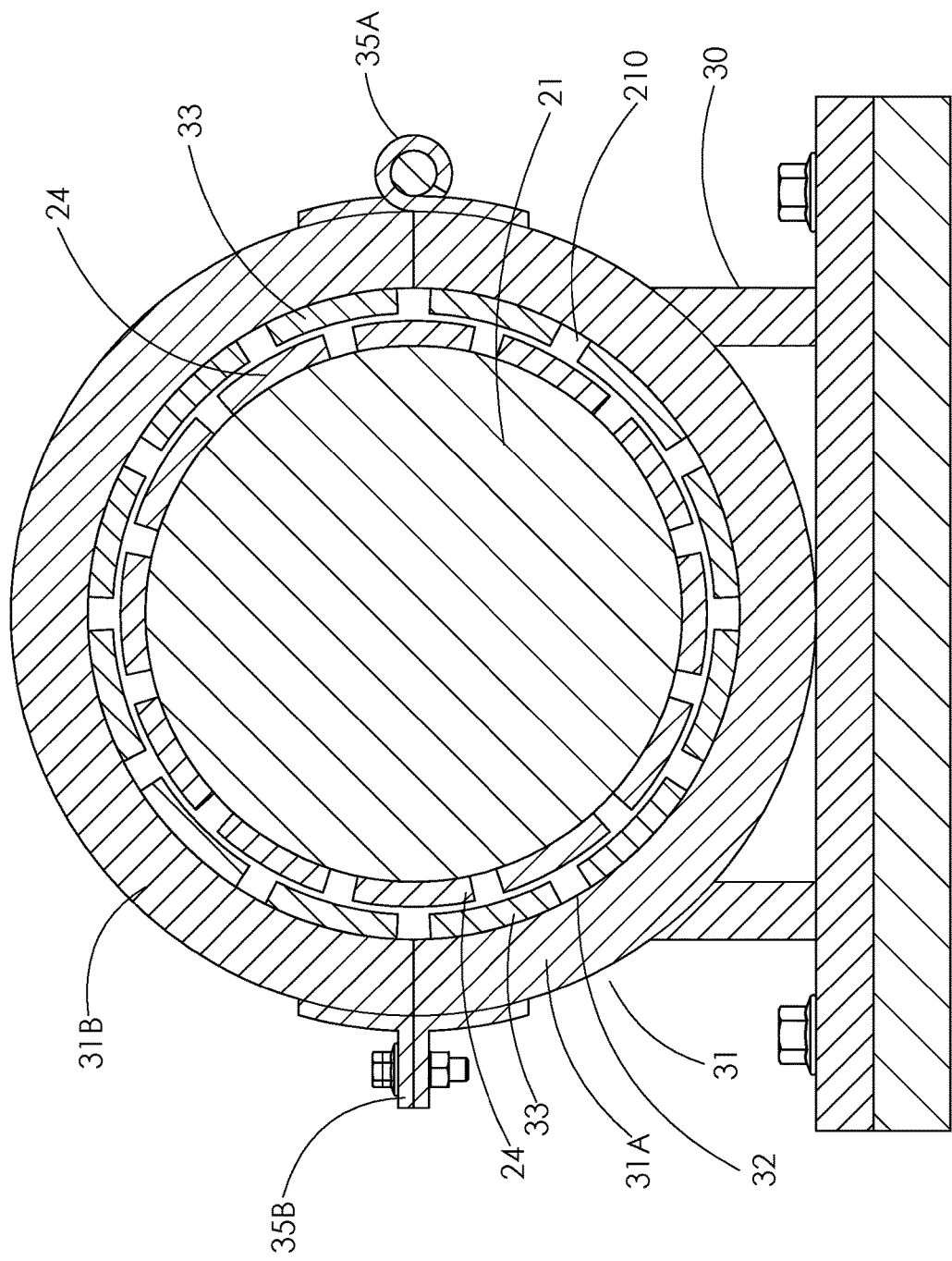
FIG. 5 is a sectional view of the invention.
Figure 6:
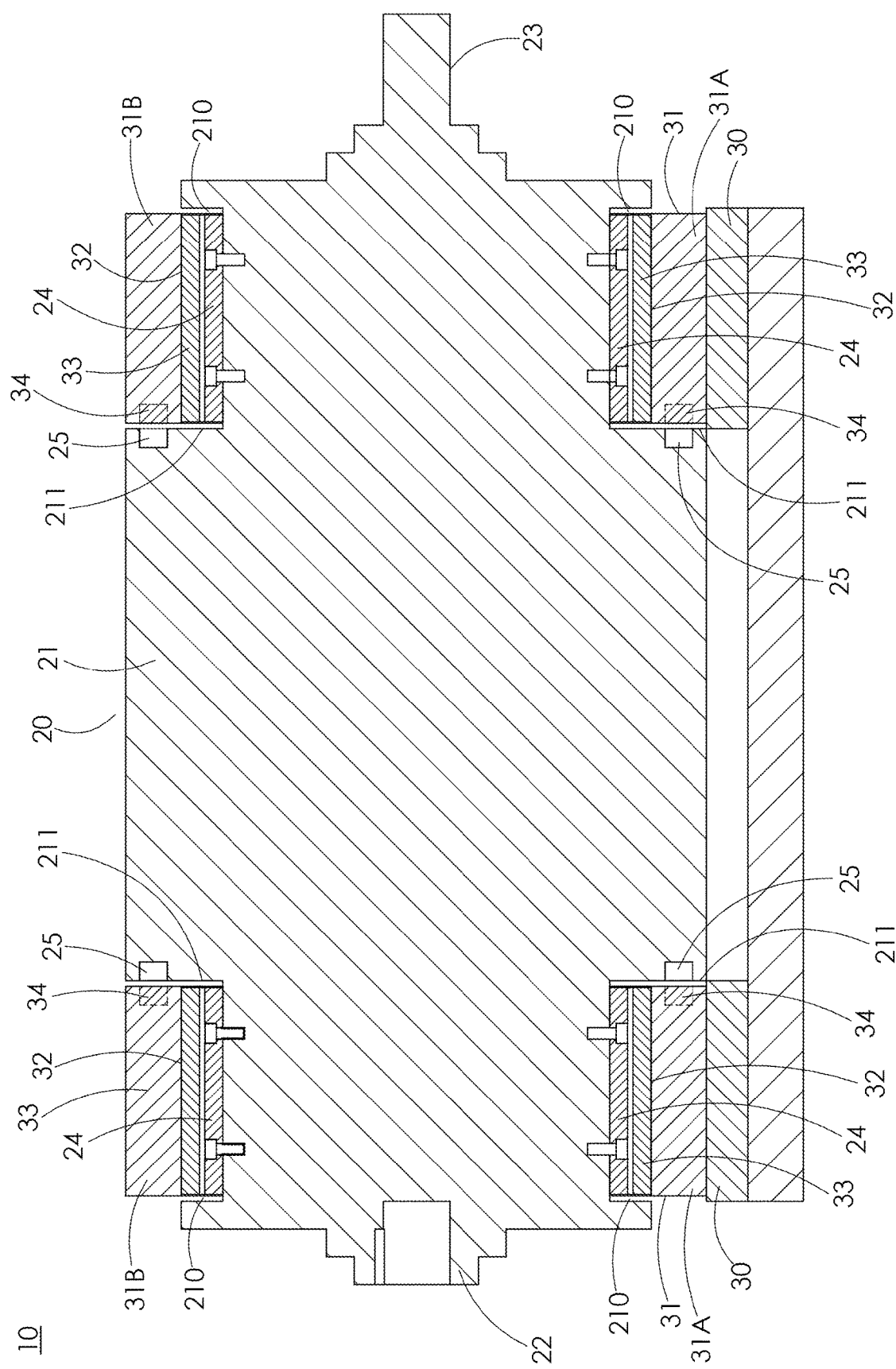
FIG. 6 is another sectional view of the invention.
Figure 7:
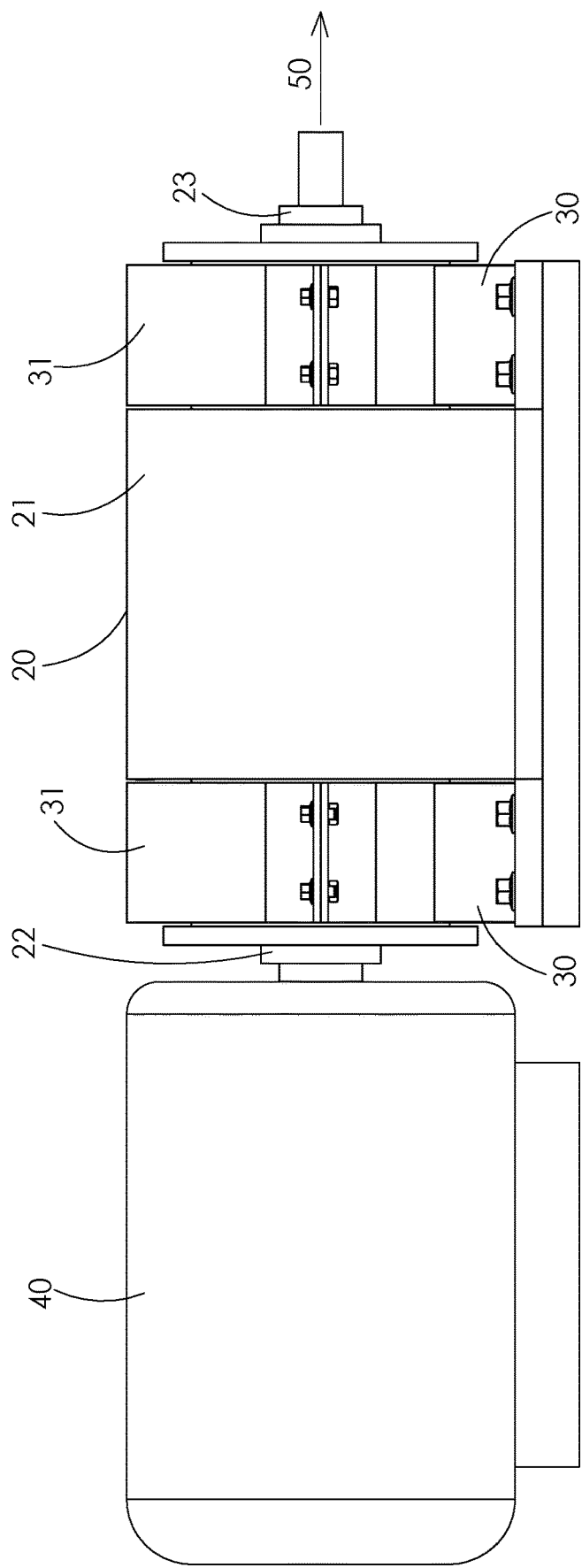
FIG. 7 is a schematic view of an embodiment of the invention in use.

As shown in FIG. 5, FIG. 6 and FIG. 7, when the rotational output end of a power source 40 is connected to the power connection portion 22 of the circular rotary unit 20 and the rotational power is output from the power connection portion 23 to a load 50 (not shown), the circular rotary unit 20 is suspended by the holder 30, so that when the power source 40 drives the circular body 21 to rotate, the circular body 21 can rotate relative to the holder 30 without friction or being in contact with the brackets 31. The gravitational inertia generated by the circular body 21 during its high-speed rotation enables the power source 40 to drive the load 50 with lower energy consumption, thereby achieving labor-saving or energy-saving benefits.

According to the above embodiment, as shown in FIG. 2 to FIG. 6, an annular groove 210 is formed on the circumferential surface of each of the two ends of the circular body 21. The first magnet assembly 24 is composed of a plurality of magnet blocks that are arranged in sequence and secured in the annular groove 210. The second magnet assembly 33 on the receiving circular hole 32 of each of the pair of brackets 31 is composed of a plurality of magnet blocks that are arranged in sequence and secured on the inner wall of the receiving circular hole 32. The second magnet assembly 33 and the first magnet assembly 24 form a repulsive magnetic force in the annular groove 210. By the second magnet assembly 33 being confined in the annular groove 210 to cooperate with the first magnet assembly 24, both ends of the circular body 21 are supported by the pair of brackets 31, thereby obtaining a positioning effect to prevent axial detachment.

According to the above embodiment, as shown in FIG. 2, FIG. 3, FIG. 4 and FIG. 6, a third magnet assembly 34 is provided on at least one of two axial sides facing each other or not facing each other of the pair of brackets 31. The pole of the axial outer surface end of the third magnet assembly 34 is one of south (S) or north (N) poles. The two ends of the circular body 21 each have a magnet mounting end face 211 relative to the third magnet assembly 34. A fourth magnet assembly 25 is provided on the magnet mounting end face 211 corresponding to the third magnet assembly 34. The pole of the axial outer surface end of the fourth magnet assembly is the same pole as the third magnet assembly 34. Both ends of the circular body 21 have axial and oppositely oriented repulsive magnetic forces to restrain and counterbalance each other, so that the circular body 21 are confined to rotate relative to the pair of brackets 31 in a manner that does not contact the pair of brackets 31 and does not retreat axially. The third magnet assembly 34 and the fourth magnet assembly 25 are each composed of a plurality of round magnets and/or magnet blocks (not shown) that are arranged in sequence and secured to the axial side of the corresponding bracket 31 and the magnet mounting end face 211 in a magnetically repulsive manner, so as to achieve the effect that the magnet mounting end face 211 is not in contact with the corresponding bracket 31.

Figure 2:
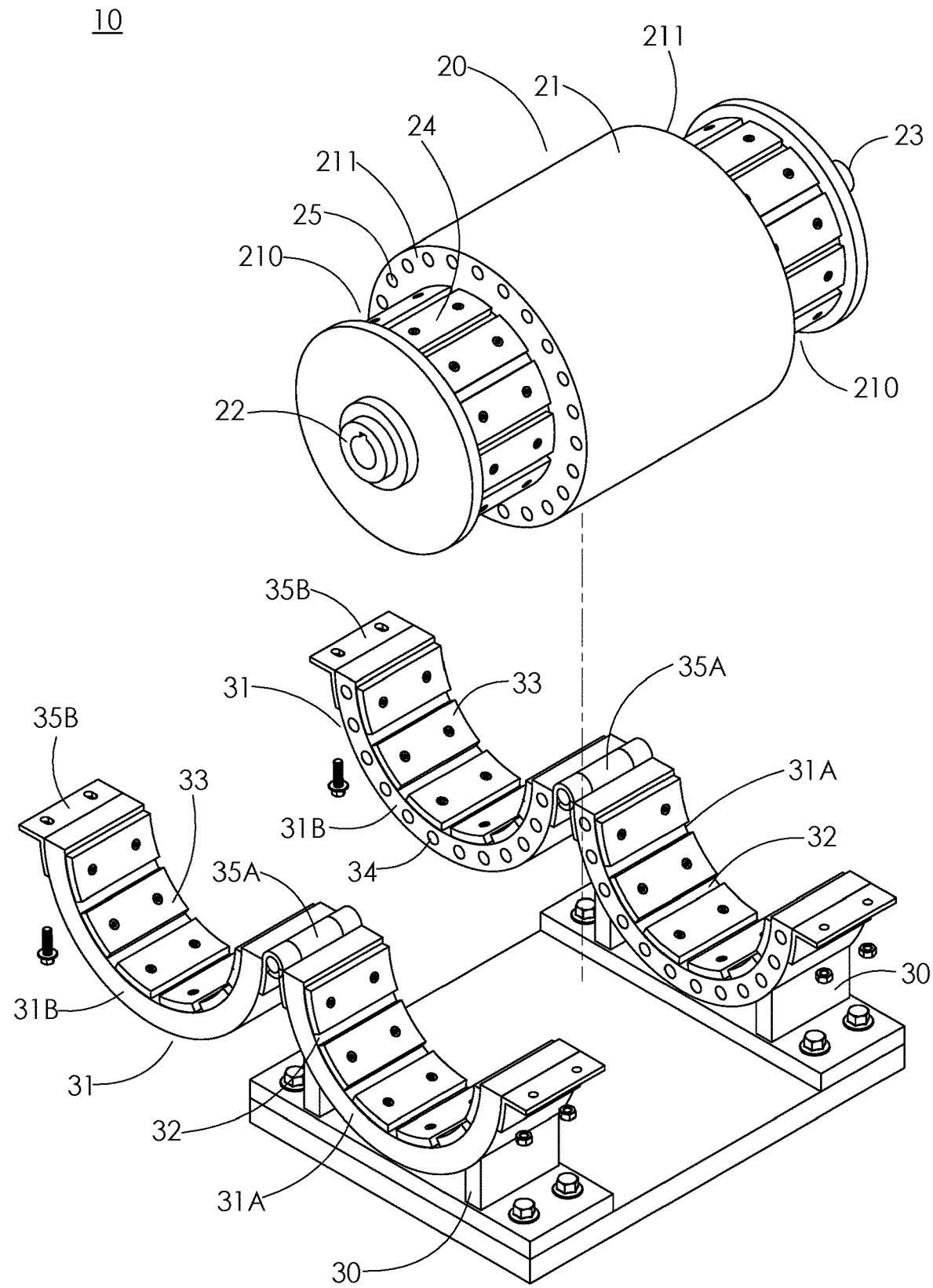
FIG. 2 is an exploded view of the invention.
Figure 3:
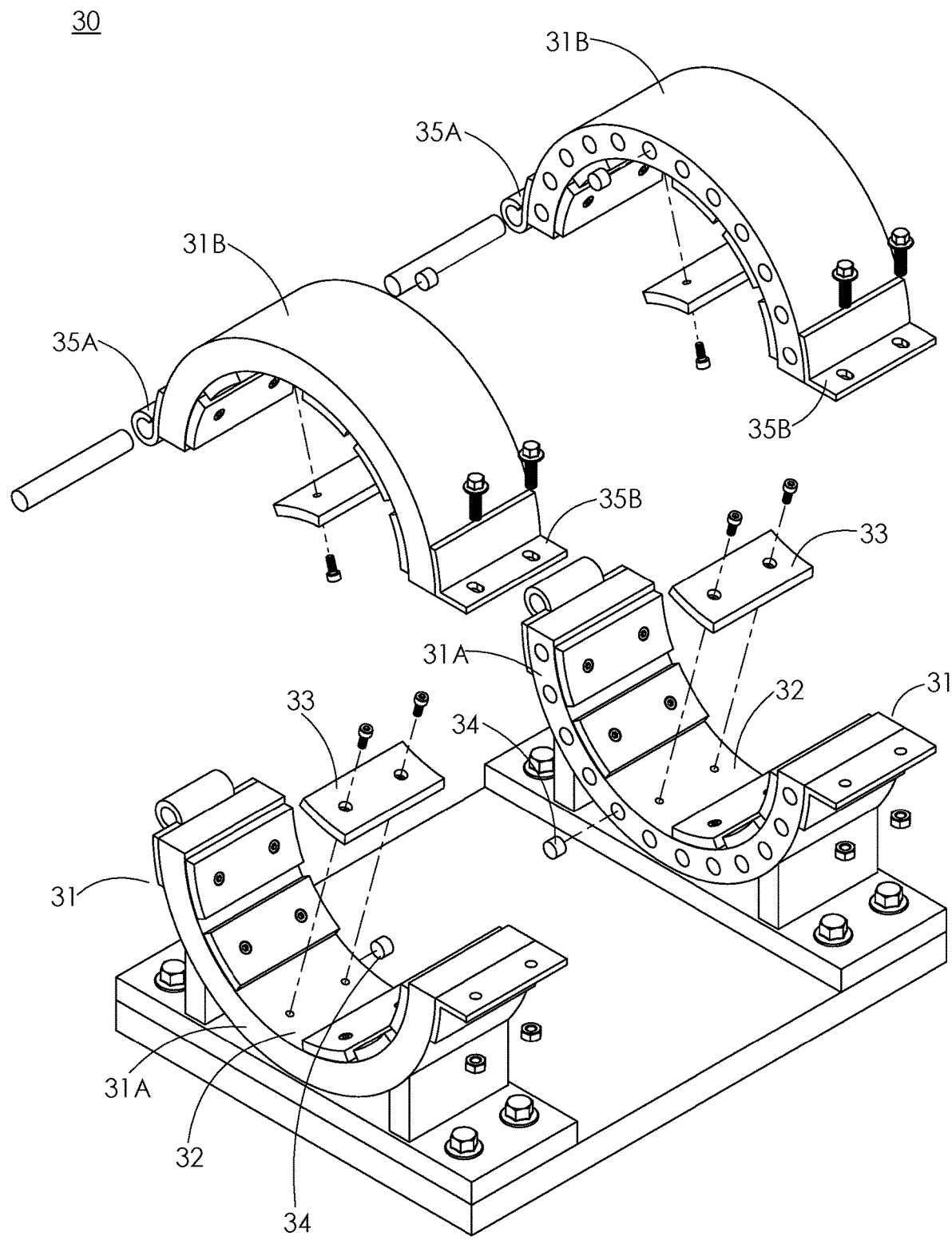
FIG. 3 is an exploded view of the holder of the invention.
Figure 4:
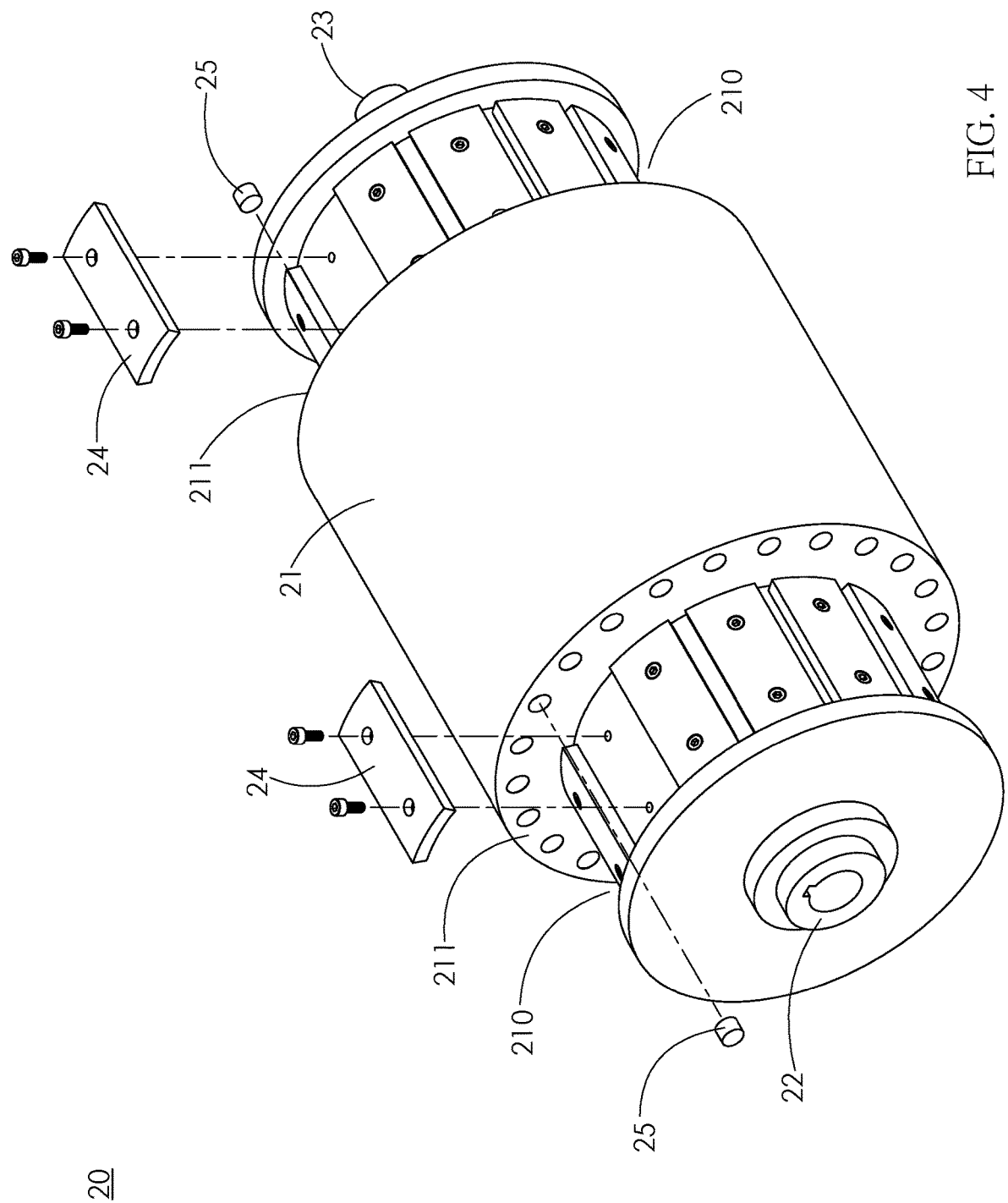
FIG. 4 is an exploded view of the first magnet assembly of the invention.

According to the above embodiment, as shown in FIG. 2, FIG. 3, and FIG. 5, the pair of brackets 31 each includes a pair of half brackets 31A, 31B that are connected to each other to form the receiving circular hole 32. Coupling members 35A, 35B are provided on the radial outer edges of two butt joints of the pair of half brackets 31A, 31B for restricting separation of the pair of half brackets 31A, 31B. As shown in FIG. 1 and FIG. 2, the connection of the pair of half brackets 31A, 31B can be released by the coupling members 35A, 35B, which facilitates the assembly or disassembly of the circular rotary unit 20 and the holder 30. As shown in FIG. 2, FIG. 3, and FIG. 5, the coupling members 35A, 35B on the two butt joints of the pair of half brackets 31A, 31B are in the form of a hinge and lugs locked by screws. The coupling member 35B in the form of lugs locked by screws may be used for releasing one of the butt joints of the pair of half brackets 31A, 31B, so that the pair of half brackets 31A, 31B can be pivoted for mounting or dismounting the circular body 20.

Figure 8:
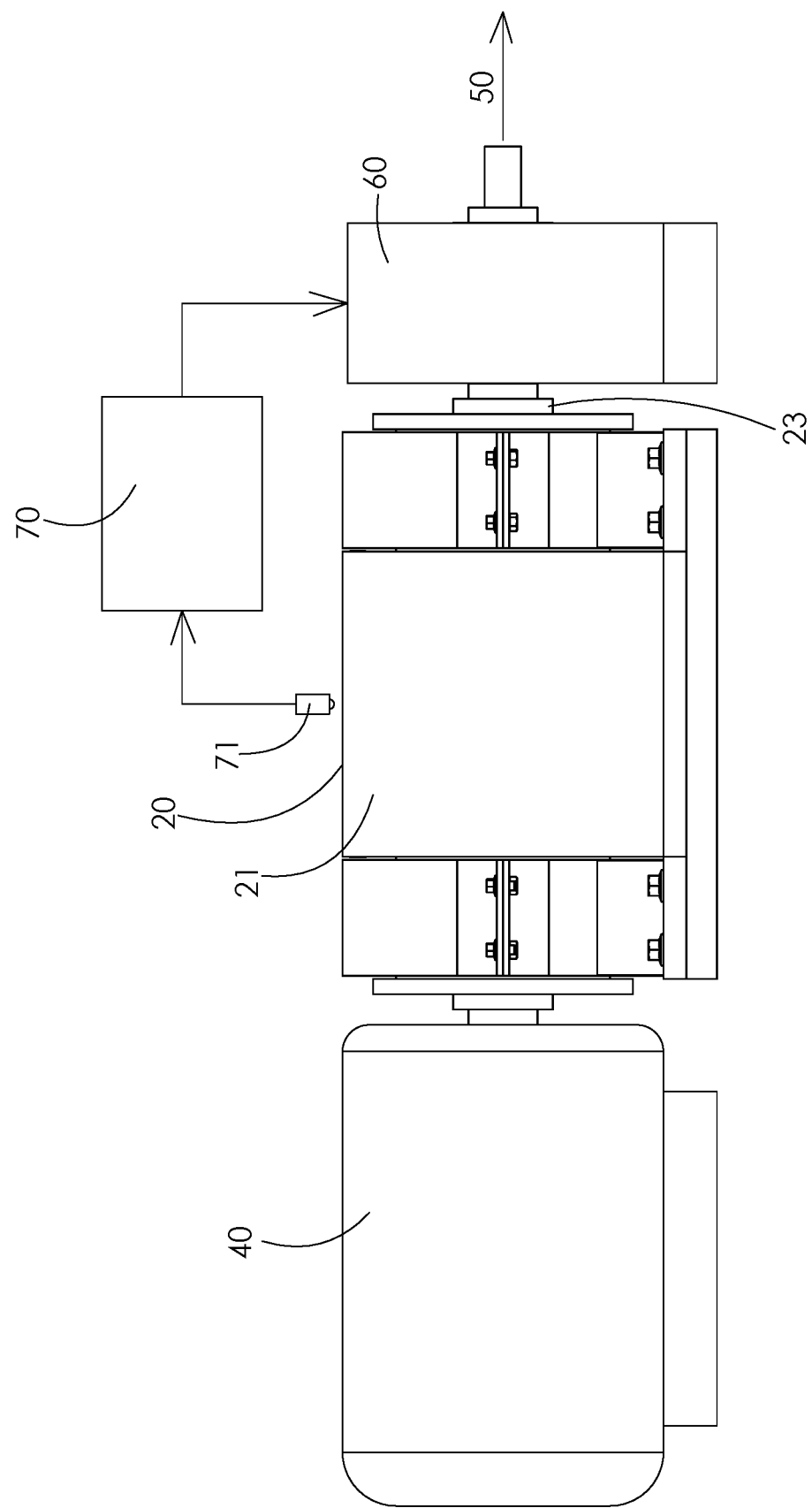
FIG. 8 is a schematic view of another embodiment of the invention in use.

According to the above embodiment, as shown in FIG. 8, the output connection portion 23 of the circular rotary unit 20 is connected to a clutch 60. The clutch 60 outputs the rotational power through a power output end 61. When the circular body 21 is initially rotated by the power source 40, the clutch 60 selects the power output end 61 not to output rotational force to the load 50, so that the power source 40 can drive the circular body 21 to rotate without having to bear the load 50, thereby reducing the initial rotation resistance. The clutch 60 is an electronically controlled clutch. The clutch 60 is controlled by a controller 70 to control the power output timing of the power output end 61. The controller 70 detects the rotational speed of the circular body 21 through a rotational speed detector 71. When the circular body 21 reaches a predetermined high rotational speed, the controller 70 automatically controls the power output end 61 of the clutch 60 to output power. On the contrary, when the predetermined high rotational speed is not reached, the power output of the power output end 61 is paused.

While the invention has been described in terms of preferred embodiments, those skilled in the art will recognize that the invention can be practiced with modifications within the spirit and scope of the appended claims.

What is claimed is:

1. A power output economizing device, comprising:
a circular rotary unit, including a cylindrical circular body with a power connection portion and an output connection portion at respective centers of two end faces thereof, a first magnet assembly being provided on each of circumferential surfaces of two ends of the circular body, a pole of a radial outer surface end of the first magnet assembly being one of south (S) or north (N) poles; and
a holder, including a pair of brackets relative to the first magnet assemblies at the two ends of the circular body, the pairs of brackets each having a receiving circular hole corresponding to the circular body, the receiving circular hole having a diameter slightly greater than that of the circular body, the receiving circular hole surrounding a periphery of the first magnet assembly, a second magnet assembly being provided on an inner wall of the receiving circular hole, a pole of a radial outer surface end of the second magnet assembly being the same pole as the first magnet assembly so that the pair of brackets support the two ends of the circular body in a suspending manner.

2. The power output economizing device of claim 1, wherein an annular groove is formed on the circumferential surface of each of the two ends of the circular body, the first magnet assembly is composed of a plurality of magnet blocks that are arranged in sequence and secured in the annular groove; the second magnet assembly on the receiving circular hole of each of the pair of brackets is composed of a plurality of magnet blocks that are arranged in sequence and secured on the inner wall of the receiving circular hole, the second magnet assembly and the first magnet assembly form a repulsive magnetic force in the annular groove.

3. The power output economizing device of claim 1, wherein a third magnet assembly is provided on at least one of two axial sides facing each other or not facing each other of the pair of brackets, a pole of an axial outer surface end of the third magnet assembly is one of south (S) or north (N) poles; the two ends of the circular body each have a magnet mounting end face relative to the third magnet assembly, a fourth magnet assembly is provided on the magnet mounting end face corresponding to the third magnet assembly, and a pole of an axial outer surface end of the fourth magnet assembly is the same pole as the third magnet assembly.

4. The power output economizing device of claim 3, wherein the third magnet assembly and the fourth magnet assembly are each composed of a plurality of round magnets and/or magnet blocks that are arranged in sequence and secured to the axial side of the corresponding bracket and the magnet mounting end face in a magnetically repulsive manner.

5. The power output economizing device of claim 1, wherein the pair of brackets each includes a pair of half brackets that are connected to each other to form the receiving circular hole, and coupling members are provided on radial outer edges of two butt joints of the pair of half brackets for restricting separation of the pair of half brackets.

6. The power output economizing device of claim 5, wherein the coupling members on the two butt joints of the pair of half brackets are in the form of a hinge and lugs locked by screws.

7. The power output economizing device of claim 1, wherein the output connection portion of the circular rotary unit is connected to a clutch, and the clutch outputs a rotational power through a power output end.

8. The power output economizing device of claim 7, wherein the clutch is controlled by a controller to control a power output timing of the power output end, and the controller detects a rotational speed of the circular body through a rotational speed detector.

* * * * *